United States Patent [19]

Oretti

[11] Patent Number: 4,728,139
[45] Date of Patent: Mar. 1, 1988

[54] TONGS

[75] Inventor: John E. Oretti, Doncaster, Australia

[73] Assignee: Peter Fanning & Company Pty. Ltd., Deepdene, Australia

[21] Appl. No.: 891,216

[22] Filed: Jul. 28, 1986

[30] Foreign Application Priority Data

Aug. 7, 1986 [AU] Australia .............................. PH1826

[51] Int. Cl.<sup>4</sup> ........................ A47G 21/10; A47J 43/28
[52] U.S. Cl. ..................................... 294/99.2; D7/105
[58] Field of Search ............... 294/99.2, 99.1, 2, 3, 294/7, 8, 8.5, 11, 16, 33; D7/105; 30/147, 148, 149, 150

[56] References Cited

U.S. PATENT DOCUMENTS 1,765,974  6/1930  Foltis ................................. D7/105
2,839,325  6/1958  Jeanfavre ........................... 294/99.2

FOREIGN PATENT DOCUMENTS 811925  4/1937  France ............................... 294/99.2

Primary Examiner—James B. Marbert
Attorney, Agent, or Firm—Ladas & Parry

[57] ABSTRACT

Tongs having a pair of similar-length arms, each of which merge at one, thereby inner end with an integral junction portion, are formed from a material having inherent flexibility. Retaining shoulders at the merger of each arm and the junction portion bear against a fulcrum block nested within the junction portion when the opposite, free end portions of the arms are urged together for gripping an object.

8 Claims, 12 Drawing Figures

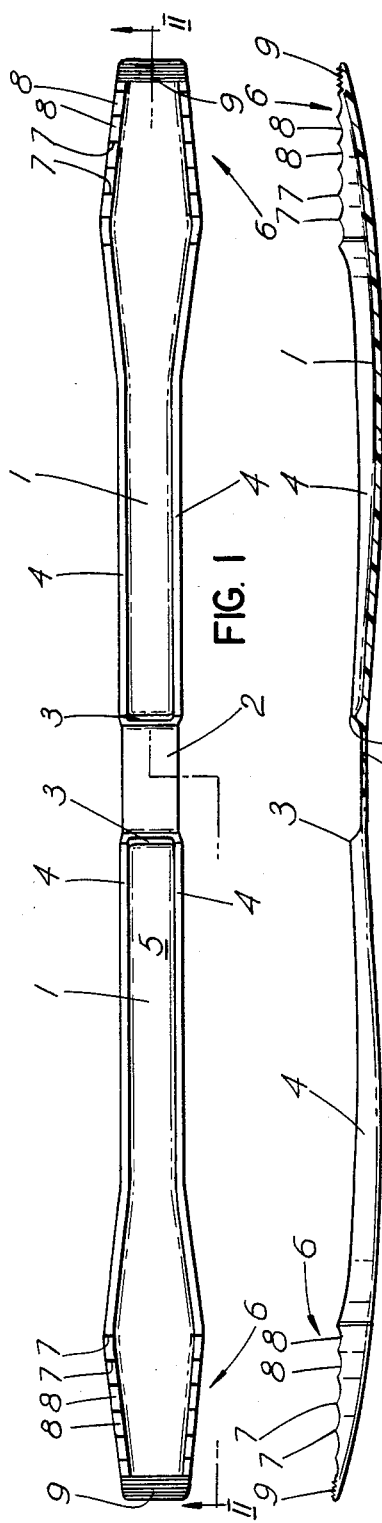
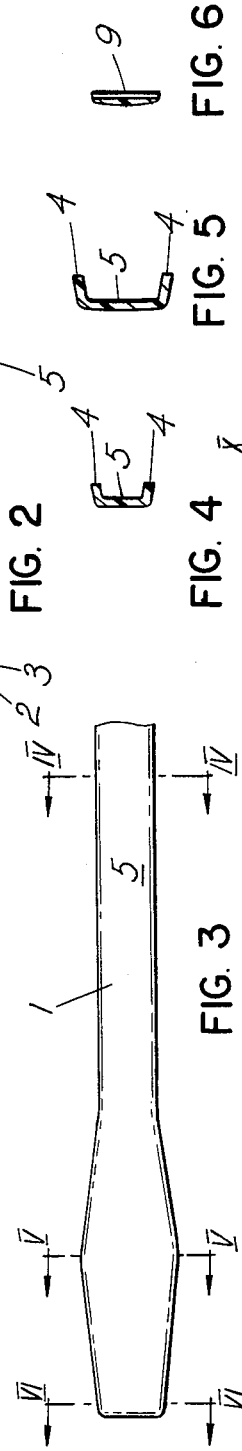
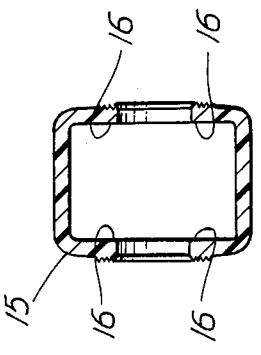
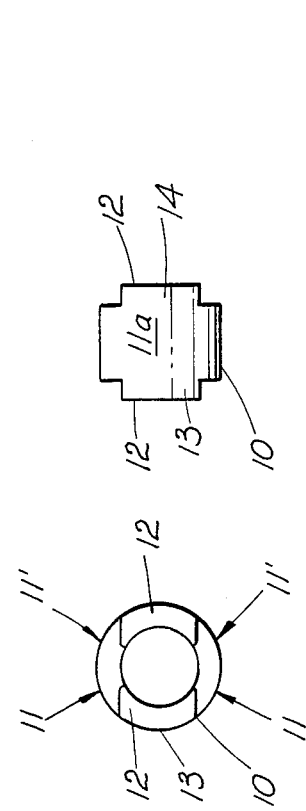

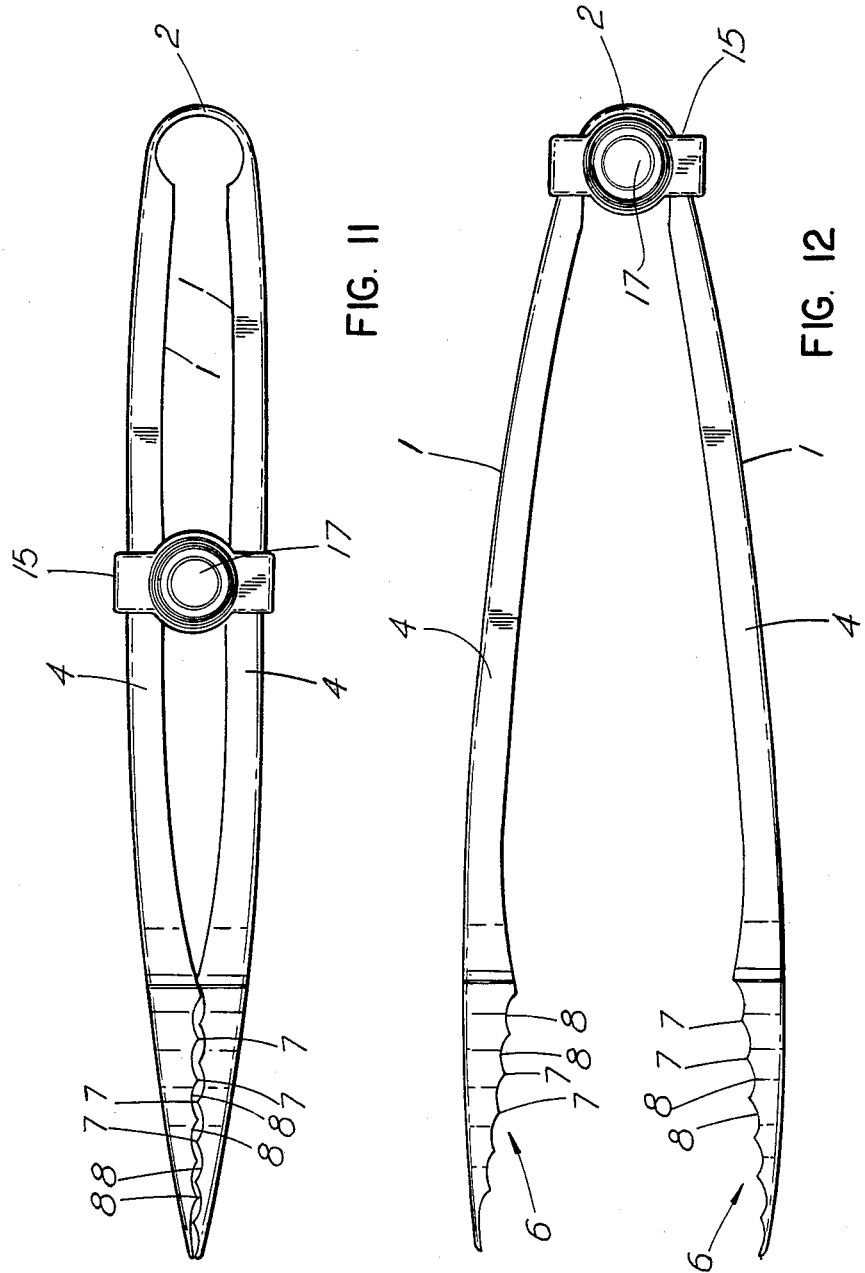

TONGS

This invention relates to tongs which may be used to handle items of food or other objects.

Many different designs of tongs are known, but generally comprise a pair of pivotally or hingedly connected substantially similar arms, opposed end portions of which may be brought into contact with each other, e.g. opening the tongs, and thus used to grip an object between them. The arms, when not in use, are generally urged apart, e.g. opening the tongs, by the resilience of the material from which the tongs are constructed or by a spring mechanism incorporated in the tong construction.

Known tongs are often complex in construction, particularly where a spring mechanism is incorporated. On the one hand, complex constructions lead to complexities in assembly and, often, in maintenance procedures such as cleaning. On the other hand, known constructions which rely upon the resilience of the material from which the tongs are made require suitable material to provide appropriate long life to the tongs. If metal, because of its inherent resilience, difficulties may be encountered in use because of the heat-conducting and/or corrosion-prone properties of the metal.

Resilient plastics materials are generally unsatisfactory for tongs stored in a closed postion because creep of the material in this position causes loss of resilience. Creep in a resilient plastics material is particularly evident in the hinge portion joining the respective arms of the tongs and is aggrevated when the tongs are stored in their closed position. In this case the creep compensates for the bending stresses in the folded hinge and causes a loss of resilience in the hinge. The tongs thus lose their ability to spring open when released from the closed position.

It is an object of the present invention to provide a tongs construction which will reduce or overcome the deficiencies of prior constructions.

Accordingly, the present invention provides tongs formed from a material having inherent flexibility. The tongs have an arms section having a pair of similar-length arms each having an inner face and an outer face, each said arm merging at one, thereby inner end thereof with an integral junction portion for flexing to bring the respective, thereby-defined inner faces of said arms into contact at their free, i.e. opposite, end portions. A retaining shoulder projects from the inner face of each arm at the merger of the arm and the junction portion, said junction portion and retaining shoulders bearing against a fulcrum block nested within the junction portion when the free end portions of the arms are urged together for gripping an object.

Tongs made in accordance with the present invention include an arms section consisting of a pair of similar length and preferably substantially identical, arms which are joined at their inner ends by an integral junction portion. Each arm has an inner face and an outer face and the junction portion is adapted to permit the respective inner faces to brought into contact at the free end portions of the arms.

Each arm includes a retaining shoulder projecting from the inner face at is inner end portion. The retaining shoulder is located where the junction portion and the arm of which it forms a part merge. In use, each retaining shoulder and the junction portion between then meet and bear against a fulcrum block as the free end portions of the respective arms are urged together. Bending stress on the junction portion is thereby substantially eliminated as the junction portion encounters no bending stress once the retaining shoulders meet their respective fulcrum.

The arms are preferably of channel form having inwardly extending flanges bordering a web which comprises the remainder of the arm. The flanges preferably commence at the inner end portion of the arm and extend substantially to the free end of the arm. The flanges increase the strength of the arm portions and may be of greater thickness than the web.

Each arm is preferably formed at its free end portion with gripping means to assist in the use of the tongs. The gripping means may consist of a plurality of longitudinally extending teeth formed in the edge of the flanges. Teeth which are opposed in use may be longitudinally displaced so that the teeth on one arm alternate with the gaps between the teeth on the opposed arm. The gripping means may additionally or alternatively include a plurality of laterally extending ribs. Such ribs may be formed at the outermost end portion at the free end of the respective arms.

The tongs of the invention are formed from a material having inherent flexibility to provide the required resilience in the junction portion and arms. Preferably the material used is a flexible plastics material and a crystalline thermoplastic material is still more preferred. The material used is preferably heat resistant to enable the tongs to withstand the high temperature experienced in cooking areas. Any appropriate plastics material may be used including polyamide and polyolefin materials. One currently preferred material is nylon 6/6.

When made in accordance with a preferred embodiment from flexible thermoplastic material, the arms section of the tongs of the present invention is preferably moulded as a strip like member in which the right hand arm, junction portion and left hand arm extend longitudinally in substantially the same plane. The arms section initially produced in strip form need not be folded about its junction portion until all the hinge components are assembled together. The junction portion of the arm section is thus formed into an arcuate rather than an angular configuration.

The tongs of the invention also include a fulcrum block which provides a bearing surface on which the junction portion and the opposed retaining shoulders of the arms section can act. The fulcrum block is nestable within the folded junction portion of the arms section and is of such dimension relative to the junction portion and the retaining shoulders that the fulcrum block forms an arcuate bearing surface extending for the full length of the junction portion and between the respective retaining shoulders.

The bearing surface provided by the fulcrum block serves two primary purposes. First, it allows the use of less material in the junction portion which forms the hinge between the two arms of the arms section. The fulcrum block supports the junction section as it is flexed when the free ends of the arms are brought together and, with the action of the retaining shoulders, reduces the amount of flexing stress applied to the junction section.

The second primary purpose served by the fulcrum block is that of a fulcrum for the cantilever bending action of the arms. Thus when the retaining shoulders and the junction portion bear against the fulcrum block as the free ends of the arms are brought together, bending of the junction portion is substantially prevented. Continued movement of the free ends of the arms towards each other causes limited tensile stresses in the junction portion but the required "spring" action in the arms is provided by the bending of the arms between the respective retaining shoulders and free ends.

The fulcrum block may be fixed within the folded junction portion of the arms section but is preferably movable away from the junction section and within the opposed channel sections of the respective arms. Portions of the fulcrum block may be relieved to accommodate the side flanges of the channel section and assist in retaining the block within them. The support lugs thus formed project from the remainder of the fulcrum block.

The tongs of the invention preferably further comprise support means of the fulcrum block which further assist in retaining the fulcrum block within the arms section. The support means may comprise a carrying frame or collar which is adapted to surround the junction portion and to slide outwardly away from this portion towards the free end portions of the respective arms. The carrying frame may include laterally opposed junction surfaces adapted to co-operate with the support lugs and with appropriate connection means to hold the carrying frame and fulcrum block together. The connection means may comprise co-operating projections and recesses in the fulcrum block and support means respectively allowing a snap fit between these two members.

Preferably however the fulcrum block is formed with an axial through bore and the support surfaces define complementary apertures in the carrying frame enabling a pin or plug connector to be passed in turn through one complementary aperture, the through bore of the fulcrum block and the second complementary aperture on the opposite side of the carrying frame. The pin or plug may be held in position by snap fitting a circumferential rib or groove in the pin or plug into a complementary groove or rib in the carrying frame.

The tongs will preferably further include a clip member which is adapted to hold the opposed arms in a closed position when the tongs are not in use. As indicated by the foregoing description, the preferred form of support means is adapted to function also as a clip member when it is moved away from the junction portion towards the free ends of the arms section.

The invention may be more clearly appreciated from the following description of a preferred embodiment illustrated in the accompanying drawings. It is to be understood that these drawings are given by way of illustration only and that the combination of features illustrated in them is not to be construed as limiting the generality of the foregoing description.

In the drawings:

FIG. 1 is a plan view showing the interior of the arms section as initially formed, FIG. 2 is a side elevation of the left hand end, and a section on the line II—II, of FIG. 1, FIG. 3 is a plan view showing the opposite side of the left hand end of the arm section of FIG. 1, FIG. 4 is a section taken on the line IV—IV in FIG. 3, FIG. 5 is a section taken on the line V—V in FIG. 3, FIG. 6 is a section taken on the line VI—VI in FIG. 3, FIG. 7 is an end elevation of a fulcrum block, FIG. 8 is a side elevation of the fulcrum block of FIG. 7, FIG. 9 is an end elevation of a carrying frame, FIG. 10 is a section on the line X—X of FIG. 9.

FIG. 11 is a side elevation of the tongs assembled from the components illustrated in the preceding figures, shown in the closed position, and FIG. 12 is a side elevation of tongs assembled from the components shown in FIGS. 1 to 10, shown in the open position.

The arms section of FIG. 1 to 6 includes a pair of substantially-identical arms 1 joined by junction portion 2. Retaining shoulders 3 are located where the junction portion 2 and the respective arms 1 merge. Arms 1 are channel shaped in section, comprising flanges 4 bordering a web 5, for substantially the full lengths of each arm.

In the illustrated embodiment, the free end portions of each arm are formed with web 5 having an increased area compared with the end portions of the arm nearer to junction portion 2. These free end portions of increased area assist in gripping objects when the tongs are used. Further assistance is provided by gripping means formed by the scalloped section 6 of the free end portions. As best seen in FIG. 11, the number and location of the scallops at the respective end portions is such that when the free end portions are brought together in use, the teeth 7 at one end portion are opposite the recesses 8 of the opposed end portion. The gripping means is supplemented by laterally extending ribs 9 at the outermost area of the free end portion. The form of the respective gripping means may be modified depending on the proposed use of the tongs. For example, if the tongs are to be used as salad servers, the form of the gripping means could differ from that illustrated.

A fulcrum block 10, illustrated in FIGS. 7 and 8, provides a bearing surface 11a (FIG. 8) extending around approximately half its circumference between lines at 11 (or 11'). The bearing surface occurs between the positions 11 or 11' depending on the orientation of the fulcrum block relative to the junction portion. In either alternative, the bearing surface extends continuously between the retaining shoulders 3 (FIGS. 1 and 2), and provides complementary support for them and the junction portion which extends between them.

Fulcrum block 10 includes junction, i.e. end, surfaces 12 on laterally-opposed support-lug projections 13 and 14. The end surfaces 12 on the projections 13 and 14 are adapted to be abuttingly carried between opposed inner or junction surfaces 16 (FIG. 10) of a carrying frame or collar 15 illustrated in FIGS. 9 and 10 when the fulcrum block 10 and carrying frame 15 are assembled with the arms section of the tongs. Fulcrum block 10 is held within carrying frame 15 by the insertion of a plug 17 visible in FIGS. 11 and 12.

As evident from FIGS. 11 and 12, carrying frame 15 also functions as a clip member to hold the arms 1 together in the closed position of the tongs. The clip member thus provided surrounds both arms of the tongs in the closed position but is retained on the tongs in the open position.

The tongs of the invention can thus be found in the closed or storage position of FIG. 11 or the open or in use position of FIG. 12. The closed position allows convenient and unobtrusive storage in a utensils drawer or suspended from a pin or hook through the loop of the junction portion. To open the tongs, the carrying frame 15 and fulcrum block 10 therein are moved along the arms from the closed-tongs position in which the fulcrum block is intermediate the retaining shoulders and the free end portions of the arms towards the junction portion 2 until the fulcrum block 10 snaps into the junction portion 2 where it is removably held by the retaining shoulers 3. In the open position of the tongs, the fulcrum block is retained in contact with the junction portion 2 and the arms 1 act as beams cantilevered from the retaining shoulders 3 bearing against the fulcrum block 10 when the gripping, i.e. end portions of the arms 1, are moved together. The tongs may also be used in a partly open position where the fulcrum block is not forced past the retaining shoulders. In this position, movement of the gripping portions may be more finely controlled to pick up small objects.

Thus the present invention provides a tongs construction which can be made and assembled with relative simplicity using only plastics material. In particular, no metallic spring mechanism or hinging devices are required. The plastics material is not subjected in normal use to stresses which affect the useful life of the tongs.

I claim:

1. Tongs, formed from a material having inherent flexibility, comprising: an arms section comprising a pair of similar-length arms each having an inner face and an outer face, an integral junction portion, each arm merging at one, thereby inner end thereof with the integral junction portion for flexing to bring the respective, thereby-defined inner faces of the arms into contact at free, opposite-end portions of the arms, and a retaining shoulder projecting from the inner face of each arm at the merger of the arm and the junction portion; and a fulcrum block nestable within the junction portion for bearing against the junction portion and retaining shoulders, whereby, when the free, opposite-end portions of the arms are urged together to grip an object, to cantilever the arms from the retaining shoulders bearing against the fulcrum block.

2. Tongs as claimed in claim 1, and further comprising a support means for holding the fulcrum block and moving therewith along the arms between an open tongs position in which the fulcrum block is nested within the junction portion and bears against the junction portion and retaining shoulders and a closed-tongs position in which the fulcrum block is intermediate the retaining shoulders and the free end portions of the arms.

3. Tongs as claimed in claim 2, wherein the support means comprises a carrying frame having opposed inner surfaces abuttingly carrying the fulcrum block between them.

4. Tongs as claimed in claim 3, wherein each arm comprises a web portion bordered by flanges for a channel-shaped section extending substantially the full length of each arm, and gripping means at the free end portions thereof for assisting in gripping objects.

5. Tongs as claimed in claim 4, and further comprising support lugs on the fulcrum block for accommodation within the flanges of the arms in the closed tongs position and cooperation with the inner surfaces of the carrying frame and connection means for holding the carrying frame and fulcrum block together.

6. Tongs as claimed in claims 3, wherein the carrying frame surrounds the arm for forming a clip member holding the tongs in the closed position.

7. Tongs as claimed in claims 4, wherein the carrying frame surrounds the arm for forming a clip member holding the tongs in the closed position.

8. Tongs as claimed in claims 5, wherein the carrying frame surrounds the arm for forming a clip member holding the tongs in the closed position.

* * * * *